United States Patent [19]

Yoshioka et al.

[11] Patent Number: 5,459,728
[45] Date of Patent: Oct. 17, 1995

[54] RADIO COMMUNICATION APPARATUS INCLUDING TRANSMISSION ERROR CONTROL

[75] Inventors: Yuka Yoshioka; Arata Obayashi, both of Tokyo, Japan

[73] Assignee: Kabushiki Kaisha Toshiba, Kawasaki, Japan

[21] Appl. No.: 217,714

[22] Filed: Mar. 25, 1994

[30] Foreign Application Priority Data

Mar. 25, 1993 [JP] Japan .................... 5-065847

[51] Int. Cl.$^6$ ............... H04B 7/26; H04Q 7/20
[52] U.S. Cl. ................ 370/95.3; 455/56.1
[58] Field of Search .......... 370/13, 17, 95.1, 370/95.3, 100.1, 105.2; 371/7, 11.1, 11.2, 20.1, 20.4; 379/58, 59, 60, 63; 455/33.1, 34.1, 53.1, 54.1, 54.2, 56.1

[56] References Cited

U.S. PATENT DOCUMENTS

| | | | |
|---|---|---|---|
| 4,574,378 | 3/1986 | Kobayashi | 370/95.3 |
| 4,774,708 | 9/1988 | Hotta | 370/95.3 |
| 4,809,268 | 2/1989 | Tejima et al. | 370/13 |
| 5,267,230 | 11/1993 | Krishna et al. | 370/13 |
| 5,274,626 | 12/1993 | Hotta et al. | 370/95.3 |
| 5,280,471 | 1/1994 | Kondou et al. | 370/13 |
| 5,301,194 | 4/1994 | Seta | 370/95.3 |

FOREIGN PATENT DOCUMENTS

| | | |
|---|---|---|
| 2-241144 | 9/1990 | Japan . |
| 5-29970 | 2/1993 | Japan . |

*Primary Examiner*—Wellington Chin
*Attorney, Agent, or Firm*—Banner & Allegretti, Ltd.

[57] ABSTRACT

A radio communication apparatus for use in a time division multiple access (TDMA) communication system prevents signals from being transmitted through a transmitter in response to recognition that the transmitter operates during an unassigned time slot. A controller is utilized to recognize that the transmitter operates during the unassigned time slot. Power to the transmitter is disconnected in response to the recognition.

25 Claims, 10 Drawing Sheets

RADIO COMMUNICATION APPARATUS INCLUDING TRANSMISSION ERROR CONTROL

BACKGROUND OF THE INVENTION

1. Field of the Invention

The present invention relates to a radio communication apparatus such as a mobile telephone, portable telephone, cordless telephone, transceiver apparatus, satellite communication apparatus, and the like. More specifically, the present invention relates to a radio communication apparatus used in a radio communication system adopting a time division multiple access (TDMA) transmission method by which radio frequency signals are transmitted between a base station and mobile units in a burst form during one or more time slots.

2. Description of the Related Art

As the number of subscribers in cellular radio systems increase, cellular radio systems have adopted a TDMA transmission method so that signals are transmitted at a more efficient rate. In the TDMA transmission method, signals constitute a continuous sequence of frames. The length of each frame is predetermined. Further, each frame constitutes a plurality of time slots. At least one of the time slots is assigned to a particular mobile unit. The particular mobile unit transmits signals to a base station over radio links during the assigned time slot.

To make TDMA transmission work well, each mobile unit should transmit signals only during its assigned time slot. This operating requirement may, however, be violated if a circuit device of a mobile unit does not operate properly, for instance, due to a large accrued operating time of the circuit device or if there is a strong impact to the device, for example, when the mobile unit is dropped. Transmission in non-assigned time slots due to such a malfunction may cause communication interference between other mobile units and the base station during these non-assigned time slots, that is, when two different mobile units attempt to use the same time slot.

SUMMARY OF THE INVENTION

It is accordingly an object of the present invention to provide a radio communication apparatus which reduces the potential for communication interference with other radio communication units communicating with a base station.

It is another object of the present invention to provide a radio communication apparatus which detects the transmitting of a signal in an unassigned time slot.

It is still another object of the present invention to provide a radio communication apparatus which terminates the transmitting of signals upon detecting the transmitting of a signal in an unassigned time slot.

To achieve one or more of the objects as embodied and described herein, according to the present invention, a radio communication apparatus for use in a time division multiple access system wherein signals are transmitted between the apparatus and a base station over a radio link during a time slot assigned to the apparatus, comprises: a transmitter for transmitting signals to the base station over the radio link; and a controller, responsive to operation of the transmitter, for detecting the transmission of signals to the base station during an unassigned time slot, and for preventing the signals from being transmitted to the base station upon detecting the transmission of signals during the unassigned time slot.

Further, in accordance with the present invention, a method for operation of a radio communication apparatus for use in a time division multiple access system wherein signals are transmitted between the apparatus and a base station over a radio link during a time slot assigned to the apparatus, comprises the steps of: transmitting signals to the base station over the radio link; detecting the transmission of signals to the base station during an unassigned time slot; and preventing the signals from being transmitted to the base station upon detecting the transmission of signals during the unassigned time slot.

DETAILED DESCRIPTION OF THE PREFERRED EMBODIMENTS

Preferred embodiments of the present invention will be described with reference to the accompanying drawings.

Figure 1:
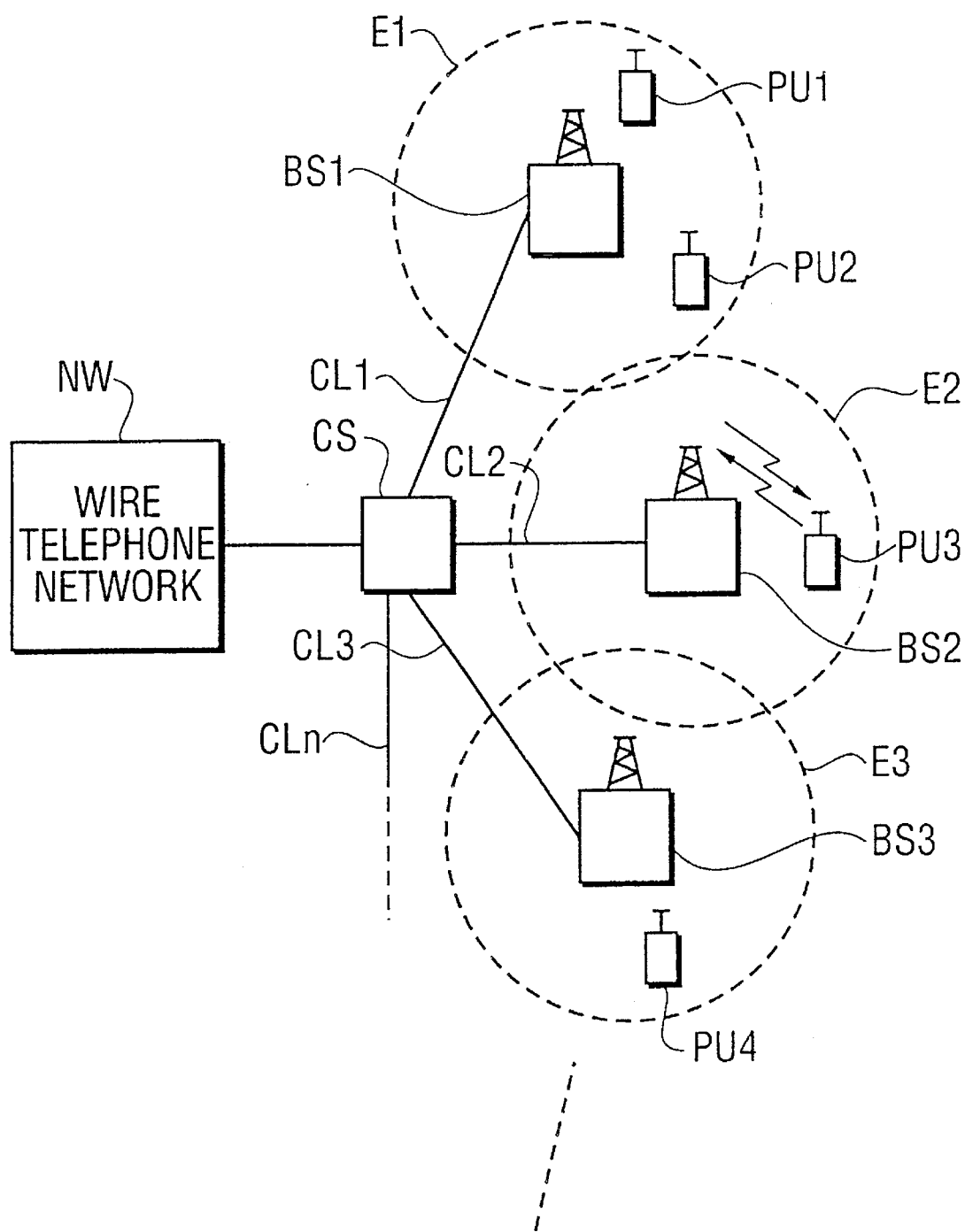
FIG. 1 illustrates an example of a known cellular radio system.

A typical cellular mobile radio communication system, as shown in FIG. 1, comprises a control station CS, typically a telecommunications switch, connected to a wire telephone network NW and a plurality of N base stations of which three are shown BS1–BS3. The N base stations are respectively connected to the control station CS via land lines CL1–CL3, and to a plurality of M mobile radio units of which four are shown PU1–PU4. Each of the N base stations BS1–BS3 has its own radio zone E1–E3, respectively. The M mobile radio units PU1–PU4 communicate with the base stations BS1–BS3 via radio links in the radio zones E1–E3.

Communication between one of the N base stations and a particular mobile radio unit typically operates in the following manner. A control channel is first established for exchanging control signals between the one base station and the particular mobile radio unit. The control channel is an assigned frequency for exchanging the control signals. The particular mobile radio unit then receives time slot information and speech channel information from the one base station over the control channel. The time slot information and the speech channel information specify the time slot and speech channel assigned to the particular mobile radio unit. The speech channel is an assigned frequency in which speech and data signals are exchanged between the one base station and the particular mobile radio unit.

Speech and data signals are transmitted from the particular mobile radio unit to the one base station over the speech channel during the assigned time slot. To transmit the speech and data signals, an encoder digitally encodes the speech and data signals. A channel encoder may be provided for interleaving error correction data with the digitally encoded speech and data signals. A modulator modulates carrier signals with the encoded speech signals and data. A transmitter then transmits the modulated carrier signals during a time slot assigned to the particular mobile radio unit.

Conversely, speech and data signals transmitted by the one base station over the speech channel during the assigned time slot are received by the particular mobile unit. A receiver receives the modulated carrier signals, a demodulator demodulates the carrier signals into digital baseband signals, and then a decoder converts the digital baseband signals to reproduce the speech and data signals. A channel decoder may be provided for deinterleaving error correction data from the digital baseband signal.

Figure 2:
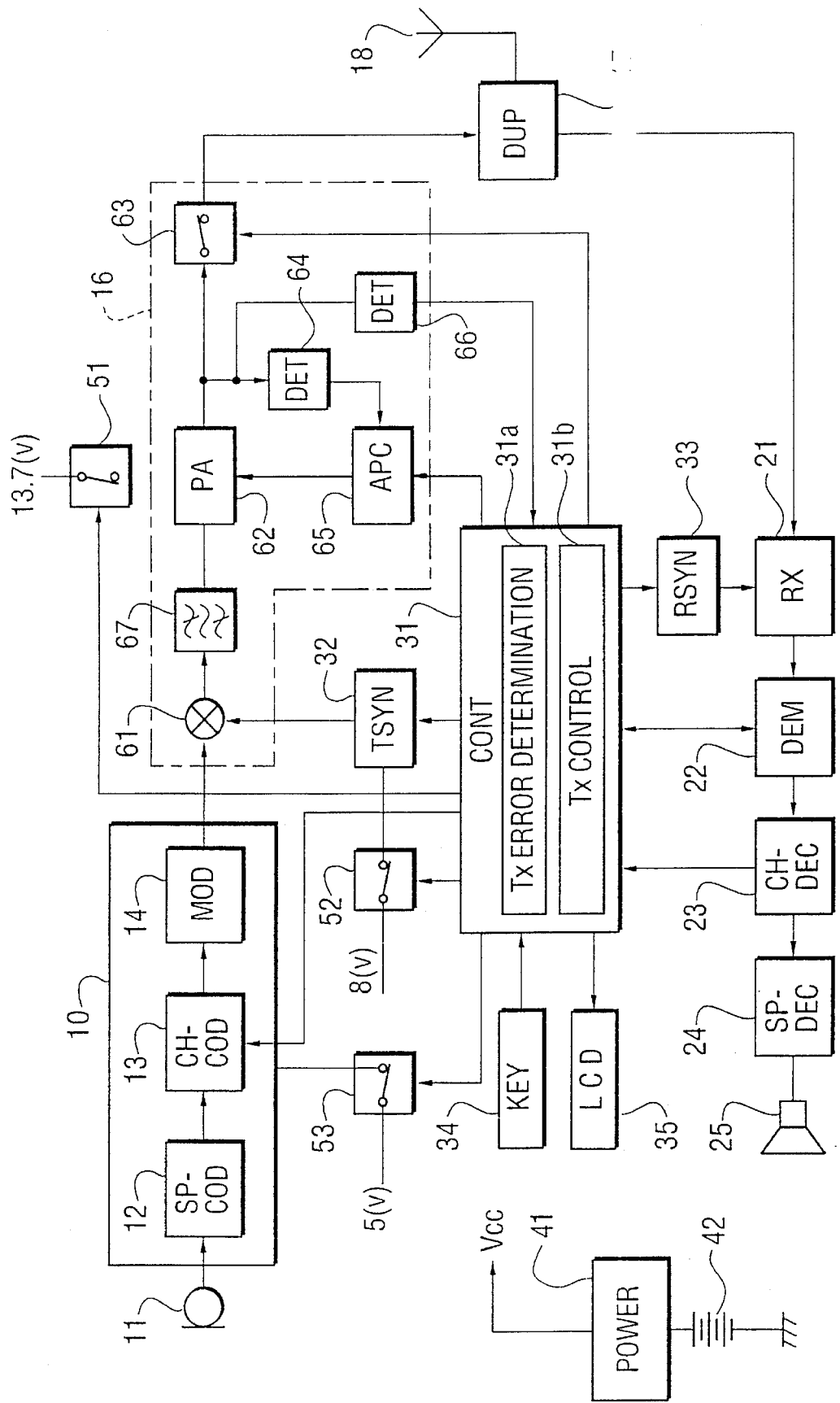
FIG. 2 is a block diagram of radio communication apparatus of the system of FIG. 1 according to a first embodiment of the present invention.

FIG. 2 is a block diagram of a radio communication apparatus for use within the mobile radio units of the system of FIG. 1. According to a first embodiment of the present invention, the radio communication apparatus comprises a reception system, a transmission system, a control system and a power supply system.

The reception system comprises an antenna 18 which is in communication with a duplexer 17. A receiver 21 is coupled to the duplexer 17. A demodulator 22 is coupled to the receiver 21. A reception synthesizer 33 provides signals of prescribed frequencies to the receiver 21. A channel decoder 23 is coupled to the demodulator 22, and to a speech decoder 24. The speech decoder 24 is coupled to a speaker 25.

The transmission system comprises the antenna 18, the duplexer 17, and a transmitter 16 coupled to the duplexer 17. A modulator 14 is coupled to the transmitter 16. A transmission synthesizer 32 provides signals of prescribed frequencies to the transmitter 16. A channel encoder 13 is coupled to the modulator 14, and to a speech encoder 12. The speech encoder 12 is coupled further to a microphone 11. The speech encoder 12, the channel encoder 13, and the modulator 14 can be provided as an integrated circuit (IC) chip set 10. The IC chip set may comprise, for example, four IC chips.

The transmitter 16 comprises a power amplifier 62 for amplifying signals to be transmitted to a base station via the duplexer 17 and the antenna 18. A mixer 61 is coupled to the modulator 14 and the transmission synthesizer 32. A bandpass filter 67 is provided between the mixer 61 and the power amplifier 62. The power amplifier 62 is also coupled to a switch 63, a level detector 64, and a transmission detector 66. The switch 63 is coupled further to the duplexer 17. An automatic power control (hereinafter referred to as APC) circuit 65, provided as a feedback element between the level detector 64 and the power amplifier 62, controls an amplifying magnitude of the power amplifier 62.

The control system comprises a controller 31, a keypad 34 having a hook switch and numeral keys, and a liquid crystal display (LCD) 35. The controller 31 is coupled to the channel encoder 13, the channel decoder 23, the transmission synthesizer 32, the reception synthesizer 33, the demodulator 22, the transmitter 16, the keypad 34, and the LCD 35.

The power supply system comprises a battery 42 and a power source circuit 41 for supplying a power supply voltage $V_{CC}$. Voltage conversion means (not shown) converts the power supply voltage $V_{CC}$ to a 13.7 V potential, an 8 V potential, and a 5 V potential. The 5 V potential is applied to the IC chip set 10 through switch 53. The 8 V potential is applied to the transmission synthesizer 32 through switch 52. The 13.7 V potential is applied to the power amplifier 62 through switch 51.

The controller 31 preferably comprises a microcomputer. In addition to controlling radio link establishment operations, the controller 31 controls switching operations of the switches 51, 52, 53 and 63. The controller 31 further provides reference voltages to the APC circuit 65 and frequency designation signals to the reception synthesizer 33 and the transmission synthesizer 32.

The operation of the radio communication apparatus of FIG. 2 in communicating with one of the N base stations of FIG. 1 is described next.

While in a stand-by mode, the radio communication apparatus communicates with one of the N base stations over a predetermined control channel. When receiving incoming signals from the one base station or generating a call request for transmission to the one base station, the radio communication apparatus receives time slot information and speech channel information from the one base station over the control channel. The time slot information and the speech channel information specify the time slot and speech channel assigned to the radio communication apparatus.

The speech channel information received by the receiver 21 is provided to the controller 31 through the demodulator 22. According to the received speech channel information, the controller 31 controls the reception synthesizer 33 to supply desired frequency signals to the receiver 21 such that the receiver 21 receives signals over the speech channel. The received signals within the speech channel are supplied to the demodulator 22. Simultaneously, the time slot information received by the receiver 21, that is information as to a particular time slot assigned to the radio communication apparatus by the one base station, is provided to the controller 31 through the demodulator 22. According to the received time slot information, the controller 31 provides an assigned time slot to the demodulator 22. According to the assigned time slot, the demodulator 22 prepares a predetermined pattern of synchronization data and captures signals within the speech channel that share the predetermined pattern. Accordingly, synchronization is established. The demodulator 22 also provides synchronization information to the controller 31 so that the controller 31 can determine the timing of the assigned time slot.

Figure 3:
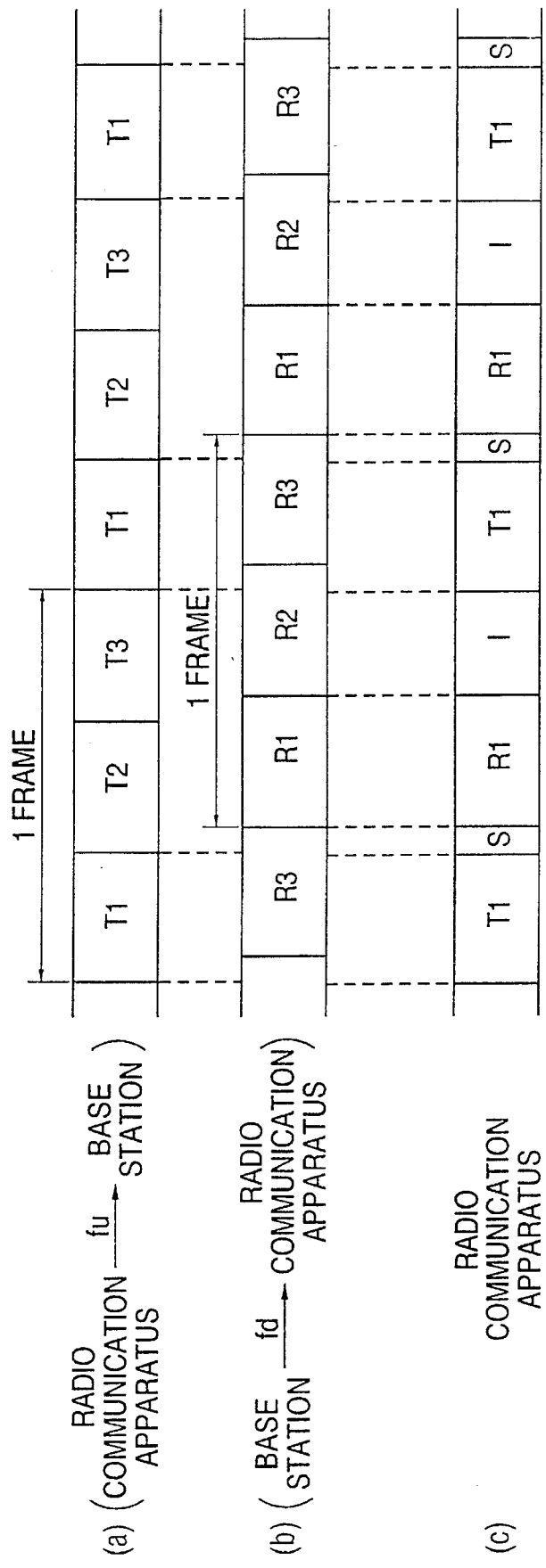
FIG. 3(a)–(c) together depict an example of the structure of time slots in a TDMA transmission method utilized by the radio communication apparatus of FIG. 2.

Referring to FIGS. 3(a)–(c), signals transmitted according to a TDMA transmission method generally constitute a continuous sequence of frames, wherein each frame constitutes a plurality of time slots. FIGS. 3(a) and (b) depict a frame of three time slots, for example. The number of time slots per frame may be greater or smaller than three depending upon the application. The length of each frame is predetermined, and may be 20 msec, for example. A first speech channel having a frequency $f_U$ is assigned for the transmission of signals from a plurality of mobile radio units to one of the N base stations as shown in FIG. 1. The first speech channel comprises a plurality of transmission time slots. FIG. 3(a) depicts the first speech channel also for use, for example having three transmission time slots, T1–T3. A second speech channel having a frequency $f_D$ is assigned for the reception of signals transmitted from the one base station to the plurality of mobile radio units. The second speech channel comprises a plurality of reception time slots. For example, FIG. 3(b) depicts the second speech channel having three reception time slots, R1–R3. The transmission time slots and the reception time slots are assigned to particular mobile radio units for bi-directional communication between the particular mobile radio units and the one base station.

In the following description, it is assumed that a first time slot is assigned to the radio communication apparatus of the present invention. Accordingly, the radio communication apparatus transmits signals to one of the N base stations of FIG. 1 during transmission time slot T1 and receives signals from the one base station during reception time slot R1. The character S indicates a standard offset. The character I indicates an idle slot. However, the operation of the radio communication apparatus of the present invention is not limited in this respect. The radio communication apparatus may be assigned various combinations of the transmission time slots T1–T3 and the reception time slots R1–R3 for bi-directional communication between the radio communication apparatus and the one base station.

During the assigned reception time slot R1, a receiver 21 of the radio communication apparatus receives radio frequency signals transmitted from the one base station via the antenna 18 and the duplexer 17. The receiver 21 mixes the received signals with signals supplied from the reception synthesizer 33 and outputs signals of an intermediate frequency to the demodulator 22. The demodulator 22 demodulates the intermediate frequency signals into digital baseband signals. The channel decoder 23 deinterleaves error correction data from the baseband signals and performs error correction operations on the digital baseband signals according to the recovered error correction data. Error corrected digital speech signals from the channel decoder 23 are applied to the speech decoder 24 and decoded into analog speech signals. Error corrected data signals from the channel decoder 23 are applied to the controller 31. The analog speech signals are outputted via the speaker 25.

During the assigned transmission time slot T1, voice signals are inputted into the microphone 11 of the radio communication apparatus. The microphone 11 outputs speech signals to the speech encoder 12. The speech signals are converted into digital speech signals in the speech encoder 12. In the channel encoder 13, error correcting codes such as Hamming, Reed Solomon, or other known correction codes, are interleaved with the digital speech signals. The interleaved digital signals are applied to the modulator 14 and modulated therein. The transmitter 16 mixes the modulated signals with signals supplied from the transmission synthesizer 32 in order to produce radio frequency signals. The transmitter 16 then power amplifies the radio frequency signals and transmits the power amplified radio frequency signals to the one base station via the duplexer 17 and the antenna 18.

The operation of the transmitter 16 during the assigned transmission time slot T1 is described in detail next. The modulated signals outputted from the modulator 14 are applied to the mixer 61. The mixer 61 mixes the modulated signals with signals supplied from the transmission synthesizer 32 and outputs radio frequency signals. The bandpass filter 67 filters the radio frequency signals in order to cut off undesired elements included in the radio frequency signals. The power amplifier 62 power amplifies the filtered signals to a certain level designated by the one base station. The power amplified signals are transmitted to the one base station via the switch 63, the duplexer 17, and the antenna 18. The amplification magnitude of the power amplifier 62 is controlled by a level detector 64 and an automatic power control circuit (APC) 65. The level detector 64 detects a power level of the power amplified signals and outputs the detected level to the APC circuit 65. In the APC circuit 65, the detected level is compared with a reference level supplied from the controller 31. The reference level varies from a level 0 to a level 7, for example. This is not to say that a 4 level, 16 level, or other reference level implementation may not be used in another embodiment. The reference level depends upon a designated level transmitted from the one base station. The resulting signals of the comparison are applied to the power amplifier 62 from the APC circuit 65. On the basis of the resulting signals, the power amplifier 62 adjusts its amplification magnitude.

According to the present invention, the radio communication apparatus includes a transmission detector 66 and a controller 31 that work together to detect transmission of the radio communication apparatus in non-assigned time slots. The transmission detector 66 compares the level of the power amplified signals with a predetermined threshold level. The transmission detector 66 may comprise a comparator. The threshold level may be a value between 0 and the lowest transmission level, for example, the level 7. When the level of the power amplified signals is equal to or exceeds the threshold level, the transmission detector 66 outputs a logical high level signal to the controller 31. On the other hand, when the level of the power amplified signals is less than the threshold level, the transmission detector 66 outputs a logical low level signal to the controller 31. The controller 31 includes transmission error determining means 31a that determines whether a logical high level signal is output from the transmission detector 66 during each transmission time slot T1, T2, T3, and transmission control means 31b that operates to prevent transmitting operations by providing logical low control signals to the switches 51, 52, 53, and 63 so as to open the switches 51, 52, 53, and 63. If the transmission error determining means 31a determines that a logical high level signal is output from the transmission detector 66 during unassigned time slots T2 and T3, the transmission control means 31b operates to prevent transmitting operations by providing logical low level control signals to the switches 51, 52, 53, and 63.

With reference to FIGS. 4(a)–(e), the operation of the controller 31, the transmission detector 66, transmission error determining means 31a and the transmission control means 31b during proper transmission of a TDMA signal within assigned transmission time slot T1 will now be described.

The controller identifies the current time slot by calculating or counting the number of clocks applied thereto. Upon identifying the time slot T1, the controller 31 provides logical high level control signals to the switches 51, 52, 53, and 63 so that the switches 51, 52, 53, and 63 close (FIG. 4(b)). Accordingly, the respective power supply potentials are supplied to the power amplifier 62, the transmission synthesizer 32, and the IC chip set 10. As a result, the transmitting operation is performed (FIG. 4(c)).

During transmission, the transmission detector 66 detects whether the level of the power amplified signals outputted from the power amplifier 62 exceeds a predetermined level. Under proper transmission as shown in FIG. 4(c), the transmission detector 66 outputs a logical high level signal during the assigned transmission time slot T1, but not during the unassigned transmission time slots T2 and T3 as shown in FIG. 4(d).

Figure 4:
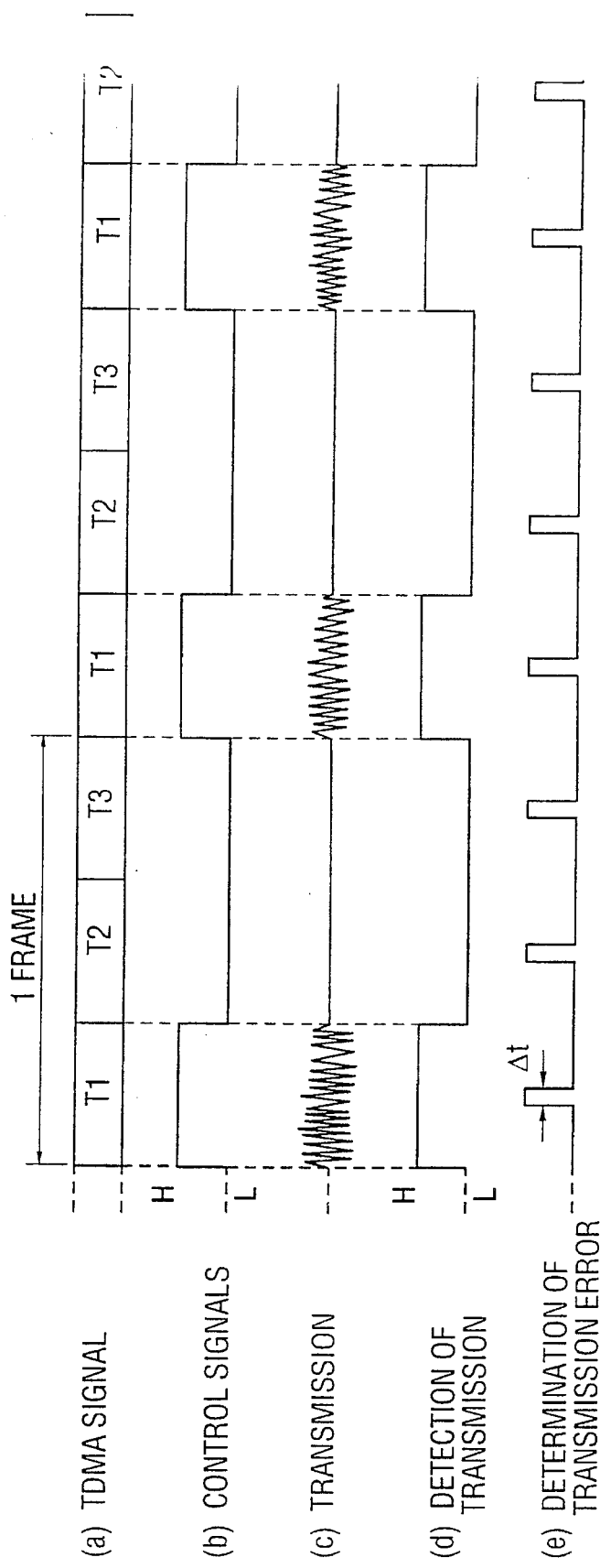
FIG. 4(a)–(e) are timing charts that together illustrate proper TDMA transmission.

The transmission error determining means 31a determines whether a logical high level signal is output from the transmission detector 66 during a time period $\Delta t$ within each time slot T1, T2, T3 as shown in FIG. 4(e). The time period $\Delta t$ is fixed, for example, to 100 μsec, but may be of longer or shorter duration depending on the application. Under proper transmission as shown in FIG. 4(c), the transmission error determining means 31a detects the logical high level signal output from the transmission detector 66 during the time period $\Delta t$ within the assigned transmission time slot T1 as shown in FIG. 4(e) and determines that the transmitting operation during the assigned transmission time slot T1 is proper.

Upon identifying the end of time slot T1, the controller 31 provides logical low level control signals to the switches 51, 52, 53, and 63 so that the switches 51, 52, 53, and 63 open (FIG. 4(b)). Accordingly, the respective power supply potentials are disconnected from the power amplifier 62, the transmission synthesizer 32, and the IC chip set 10. As a result, the transmitting operation is terminated (FIG. 4(c)).

Under proper transmission as shown in FIG. 4(c), during the time slots T2 and T3, the transmission detector 66 supplies a logical low level signal to the transmission error determining means 31a (FIG. 4(d)), and the transmission error determining means 31a determines that the transmission is properly operated.

Referring to FIGS. 5(a)-(e), the operation of the controller 31, the transmission detector 66, transmission error determining means 31a and the transmission control means 31b in utilizing a first technique for detecting transmission errors will now be described. Under special circumstances, such as a malfunction due to a component failure, the controller 31 may not provide the logical high level control signals to the switches 51, 52, 53, and 63 at the appropriate time $T_R$ (FIG. 5(b)). In such a case, responsive to the delayed logical high level control signals, the transmitting operations may begin at an incorrect time $T_W$ and end at time $T_E$ within the unassigned time slot T2 (FIG. 5(c)). The resultant transmission operation in a non-assigned time slot is a transmission error. Circumstances for such a malfunction of the controller 31 may include a large accrued operating time of circuit devices, a strong impact to the circuit devices, damage to circuit connections caused by temperature changes, or software bugs.

Figure 5:
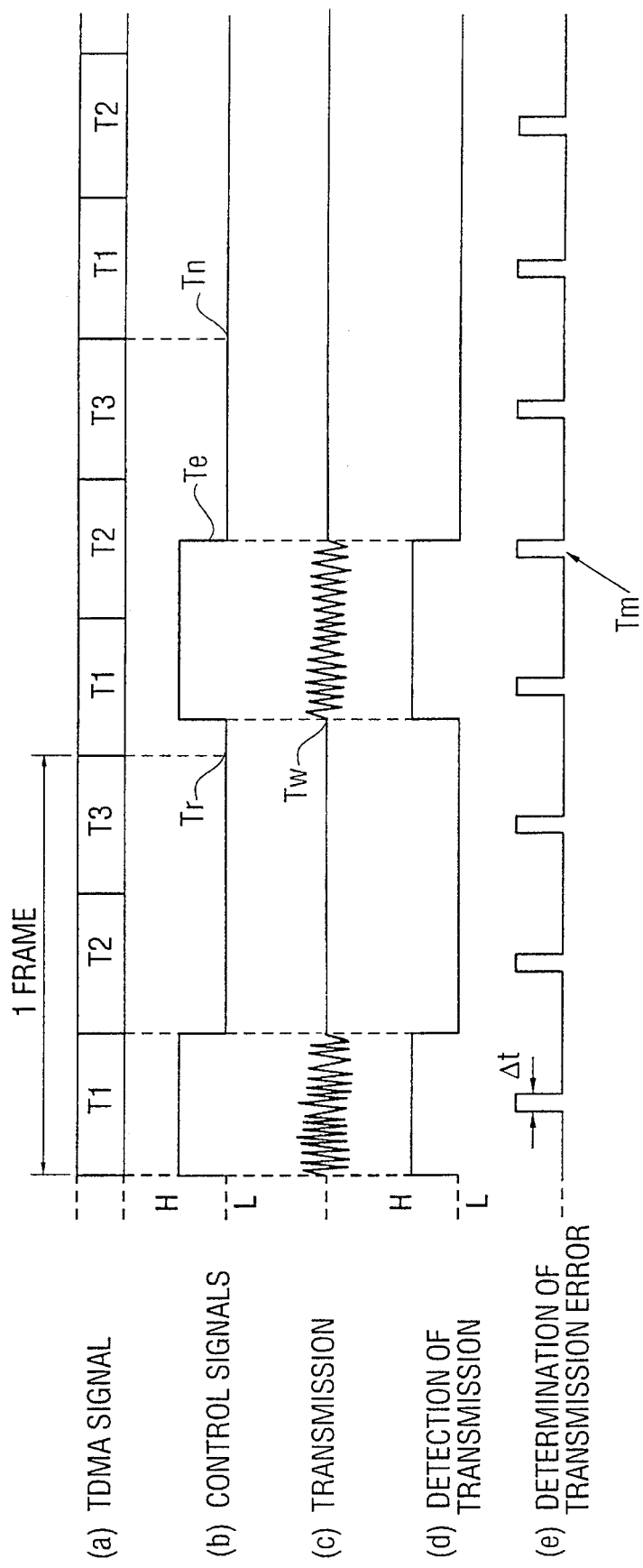
FIG. 5(a)–(e) are timing charts that together illustrate a first method of detecting transmission errors.

The transmission detector 66 detects when the level of the power amplified signals outputted from the power amplifier 62 exceeds the predetermined level. As shown in FIG. 5(d), the transmission detector 66 outputs a logical high level signal from the time $T_W$ to the time $T_E$.

According to the first technique for detecting transmission errors, the transmission error determining means 31a determines whether a logical high level signal is output from the transmission detector 66 during a time period $\Delta t$ within each of the time slots T1, T2, T3. The time period $\Delta t$ may coincide with the middle, $T_M$, of each of the time slots T1, T2, T3. As shown in FIG. 5(e), when the transmission detector 66 outputs a logical high level signal during the time period $\Delta t$ within the unassigned time slots T2 and T3, the transmission error determining means 31a determines that a transmission error has occurred.

In response to the determination that a transmission error has occurred, the transmission control means 31b operates to prevent transmitting operations by providing logical low level control signals to the switches 51, 52, 53, and 63 so as to open the switches 51, 52, 53, and 63. Accordingly, the respective power supply potentials are disconnected from the power amplifier 62, the transmission synthesizer 32, and the IC chip set 10. As a result, the transmitting operation is terminated. The logical low level control signals are continued to be provided to the switched 51, 52, 53, and 63 at a time $T_N$ and beyond. In addition, even after the termination of the transmitting operations, the transmission error determining means 31a continues to check whether a logical high level signal is output from the transmission detector 66 during a time period $\Delta t$ within each time slot T1, T2, T3.

When transmitting operations are terminated, the transmission control means 31b provides message signals to the LCD 35 to display a message to inform a user of 'transmission errors' and 'not further usable'.

In the above embodiment, upon identifying the end of the time slot T1, the transmission control means 31b may provide logical low level control signals to any one of the switches 51, 52, 53, and 63, instead of opening all of the switches 51, 52, 53, and 63. If switch 51 is opened, the voltage 13.7 V is not supplied to the power amplifier 62, and the power amplifier 62 does not operate. If switch 52 is opened, the voltage 8 V is not supplied to the transmission synthesizer 32, and the transmission synthesizer 32 does not operate. If switch 53 is opened, the voltage 5 V is not supplied to the IC chip set 10, and the speech encoder 12, the channel encoder 13, and the modulator 14 do not operate. However, when either the transmission synthesizer 32, the speech encoder 12, the channel encoder 13, or the modulator 14 is not operating, it is undesirable to output signals from the mixer 61. Therefore, when either the transmission synthesizer 32, the speech encoder 12, the channel encoder 13, or the modulator 14 is not operating, undesired frequency signals are filtered by the bandpass filter 67. As a result, very low level signals are applied to the power amplifier 62 that when power amplified and transmitted do not interfere with the operation of other mobile radio units. If switch 63 is opened, the power amplified signals outputted from the power amplifier 62 are not applied to the duplexer 17. Therefore, the power amplified signals are not transmitted to the one base station.

In the above embodiment, the transmission error determining means 31a determines whether a logical high level signal is output from the transmission detector 66 during a time period $\Delta t$ within each time slot T1, T2, T3. The time period $\Delta t$ may be a predetermined interval equal to or less than the duration of one time slot.

Figure 6:
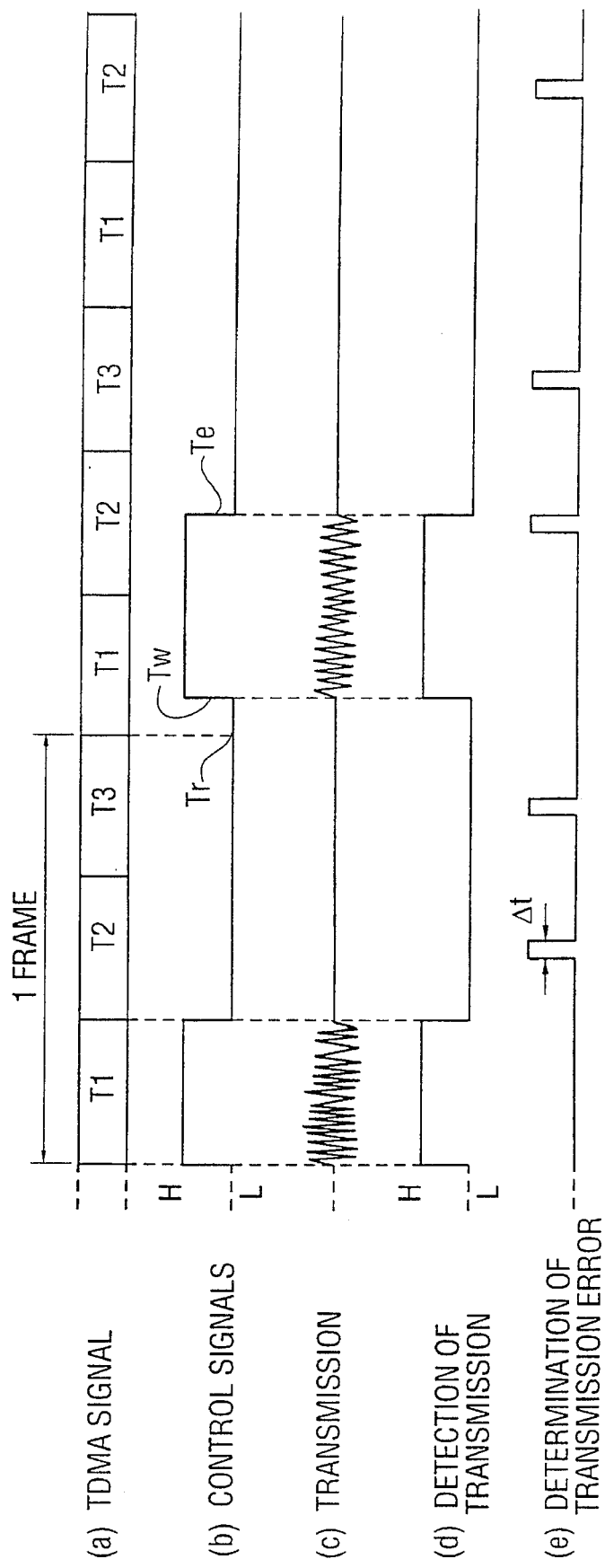
FIG. 6(a)–(e) are timing charts that together illustrate a second method of detecting transmission errors.

Referring to FIGS. 6(a)-(e), the operation of the controller 31, the transmission detector 66, transmission error determining means 31a and the transmission control means 31b in utilizing a second technique for detecting transmission errors will now be described. The only difference between the second technique and the first technique described above with respect to FIGS. 5(a)-5(e) is the operation of the transmission error determining means 31a. As shown in FIG. 6(e), during the assigned time slot T1, it is unnecessary to check for transmission errors which would interfere with the communication between other mobile radio units of FIG. 1 and the one base station that occurs during the unassigned time slots T2 and T3. Therefore, the transmission error determining means 31a determines whether a logical high level signal is output from the transmission detector 66 during a time period $\Delta t$ within the unassigned time slots T2 and T3, and not within the assigned time slot T1.

Figure 7:
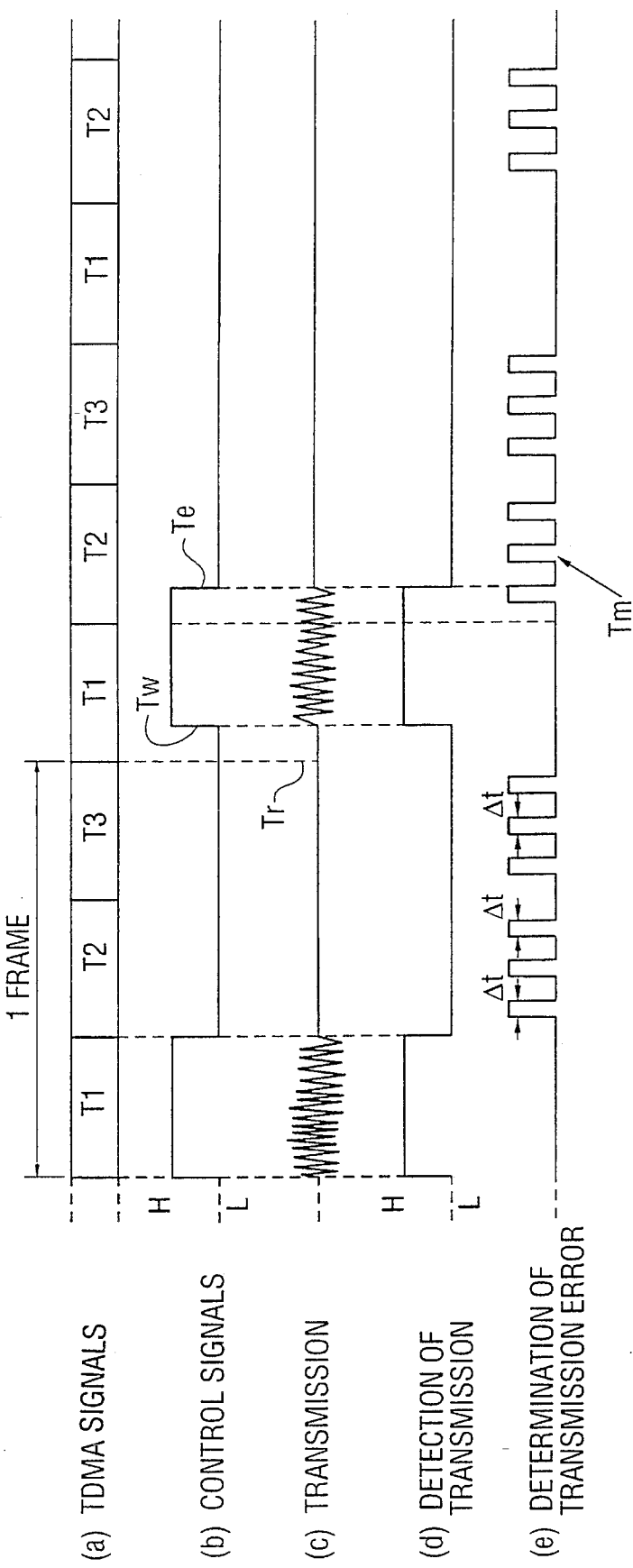
FIG. 7(a)–(e) are timing charts that together illustrate a third method of detecting transmission errors.

FIGS. 7(a)-7(e) illustrate the operation of the controller 31, the transmission detector 66, transmission error determining means 31a and the transmission control means 31b in utilizing a third technique for detecting transmission errors. As shown in FIG. 7(e), the transmission error determining means 31a determines whether a logical high level signal is output from the transmission detector 66 during a plurality of time periods Δt within the unassigned time slots T2 and T3. By checking the output of the transmission detector in this manner, a transmission error of a transmitting operation in an unassigned time slot may be detected sooner than time $T_M$ as shown in FIG. 6(e). Furthermore, the second technique for detecting transmission errors as shown in FIGS. 6(a)–6(e) will not detect a transmission error if it occurs prior to the time period Δt within the unassigned time slots T2 and T3. In particular, responsive to the delayed logical high level control signals of FIG. 7(b), the transmitting operations may continue until time $T_E$ within unassigned time slot T2. If time $T_E$ does not fall within the time period Δt of unassigned time slot T2, the transmission error determining means 31a of FIG. 6(e) will not detect the transmission error. However, by the utilizing the third technique as shown in FIG. 7(e), the transmission error determining means 31a will detect the transmission error.

Figure 8:
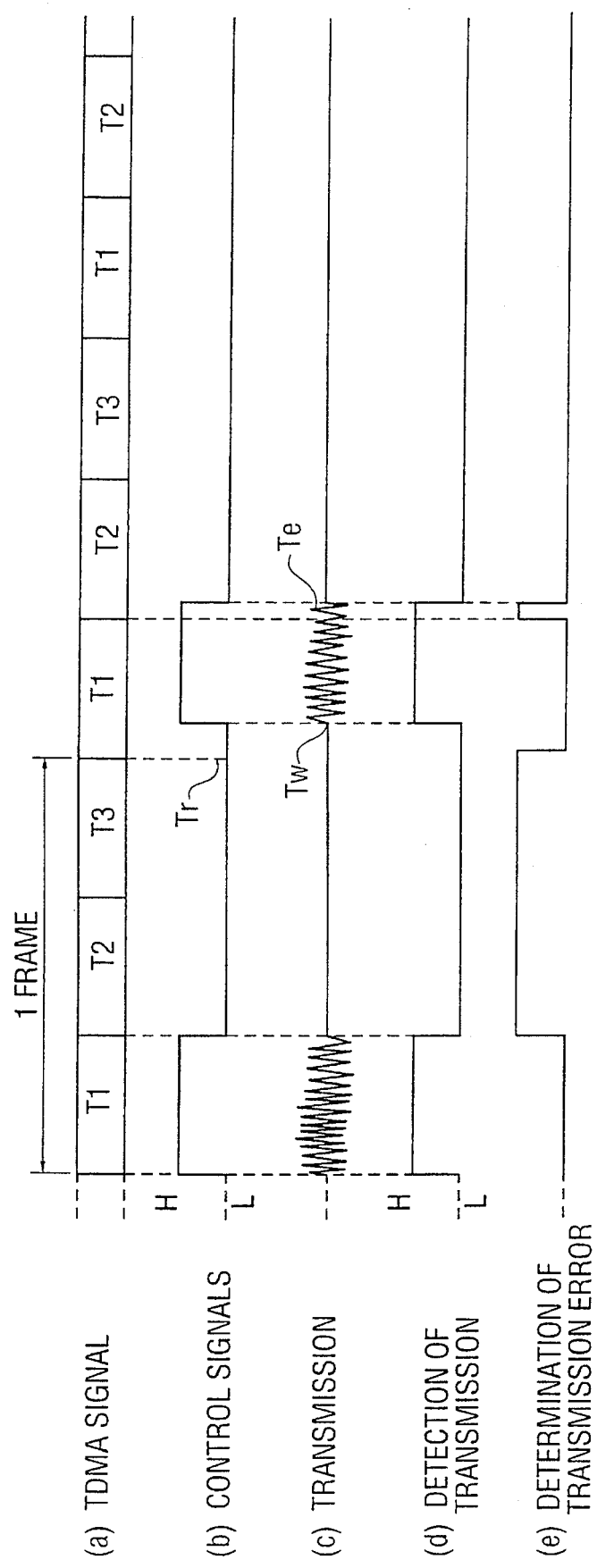
FIG. 8(a)–(e) are timing charts that together illustrate a fourth method of detecting transmission errors.

FIGS. 8(a)–8(e) illustrate the operation of the controller 31, the transmission detector 66, transmission error determining means 31a and the transmission control means 31b in utilizing a fourth technique for detecting transmission errors. As shown in FIG. 8(e), the transmission error determining means 31a determines whether a logical high level signal is output from the transmission detector 66 continuously during the unassigned time slots T2 and T3. By checking the output of the transmission detector in this manner, a transmission error may be detected at an earlier time than when using the third technique as shown in FIG. 7(e). Furthermore, upon detecting a transmission error during the unassigned time slot T2 or T3, the transmission error determining means 31a terminates its operation in checking the output of the transmission detector 66.

Figure 9:
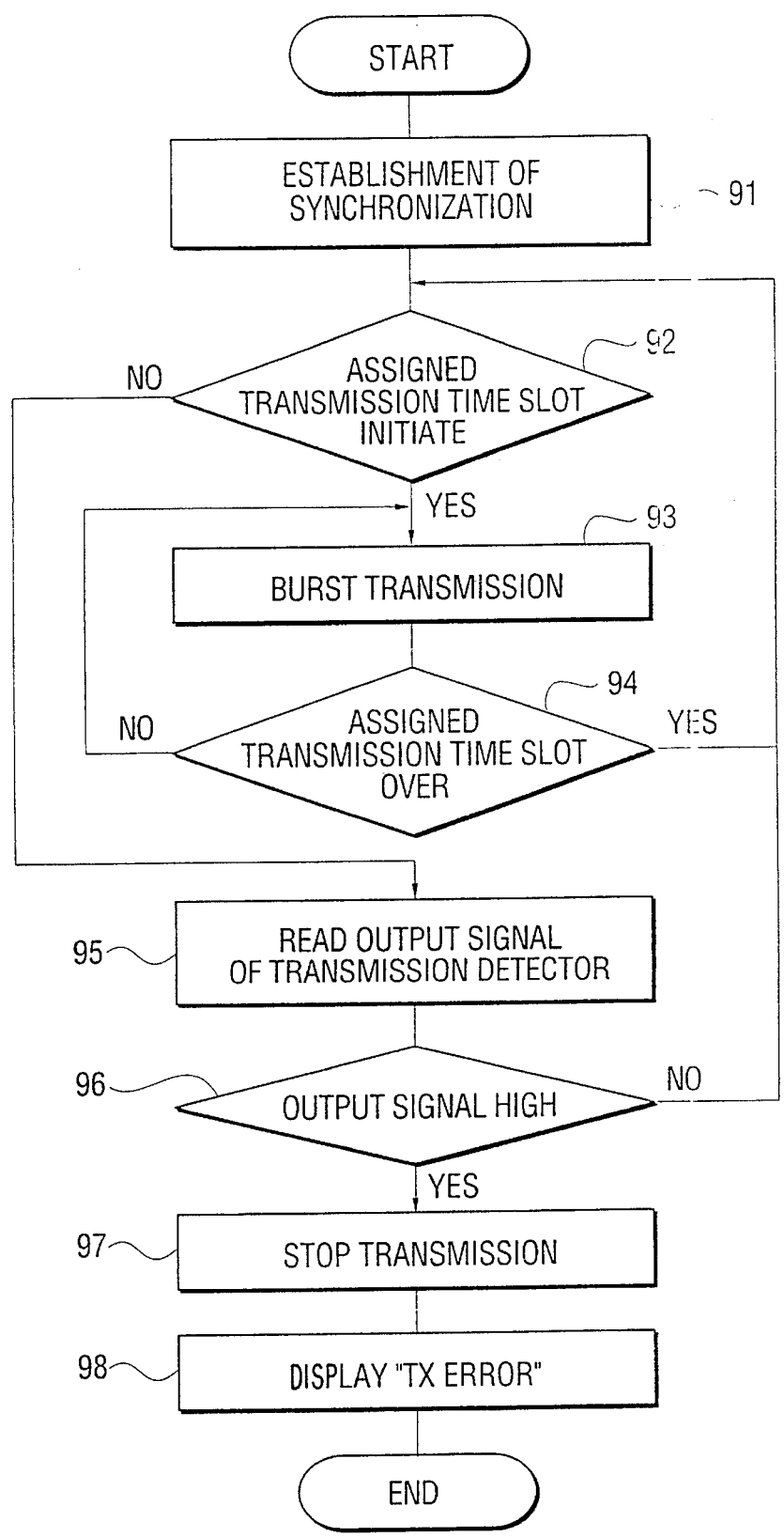
FIG. 9 is a flow chart of an operation of the radio communication apparatus according to the fourth method of detecting transmission errors of FIGS. 8(a)–8(e)

FIG. 9 is a flow chart of the operation of the radio communication apparatus according to the fourth technique of detecting transmission errors as shown in FIGS. 8(a)–8(e). First, in step 91, synchronization such as a frame synchronization and a bit synchronization is established in the demodulator 22, and the demodulator 22 provides synchronization information to the controller 31 so that the controller 31 can determine the timing of an assigned time slot for transmission. In step 92, the controller 31 determines whether the current time corresponds to the assigned time slot for transmission. When the controller 31 determines that the current time corresponds to the assigned time slot, the controller 31 controls the switches 51, 52, 53, and 63 to close. Accordingly, power amplified signals outputted from the power amplifier 62 are transmitted to the one base station in a burst form through the duplexer 17 and the antenna 18 (step 93).

Responsive to the initiation of transmission in step 93, the controller 31 determines whether a predetermined period of time corresponding to the duration of the assigned time slot has lapsed (step 94). When the controller 31 determines that the predetermined period of time has not lapsed, operation returns to step 93 to continue transmission. When the controller 31 determines that the predetermined period of time has lapsed, operation returns to step 92.

In step 92, when the controller 31 determines that the current time does not correspond to the assigned time slot, the transmission error determining means 31a determines whether a logical high level signal is output from the transmission detector 66 (steps 95 and 96). When the transmitting operation is normal, the transmission detector 66 will not output a logical high level signal during the unassigned time slots T2 and T3 even if noise signals are applied to the transmission detector 66 during the unassigned time slots. When a transmission error occurs due to a transmitting operation in an unassigned time slot, the transmission detector 66 will output a logical high level signal.

If in step 96 the transmission error determining means 31a determines that a logical high level signal is not output from the transmission detector 66, operation returns to the step 92. If the transmission error determining means 31a determines that a logical high level signal is output from the transmission detector 66, transmission control means 31b controls the switches 51, 52, 53, and 63 to open, and consequently, transmission is immediately terminated (step 97).

After terminating transmission in step 97, the controller 31 provides the LCD 35 with information signals indicating the transmission error. The LCD 35 informs the user of the transmission error so that the user realizes that the radio communication apparatus is in an unusable condition (step 98). The LCD 35 may display an error message or an error number. Furthermore, in order to inform the user of the transmission error, the radio communication apparatus may generate audible signals such as a beep tone.

Figure 10:
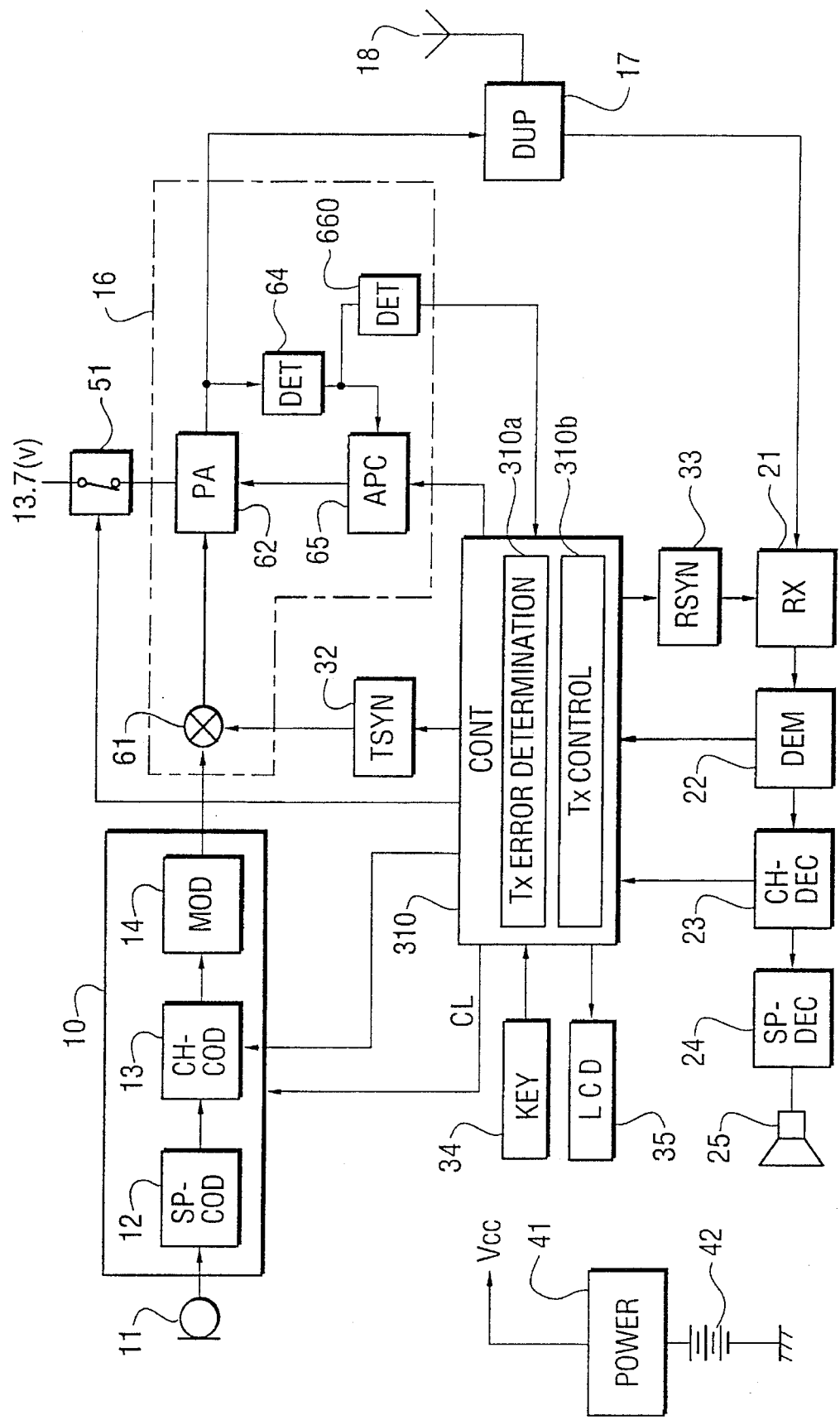
FIG. 10 is a block diagram of radio communication apparatus according to a second embodiment of the present invention.

FIG. 10 is a block diagram of radio communication apparatus according to a second embodiment of the present invention. The radio communication apparatus of FIG. 10 differs from the radio communication apparatus of FIG. 2 in that controller 31 and transmission detector 66 are replaced by controller 310 and transmission detector 660. Also, switches 52, 53, and 63 are not provided. Therefore, power supply connections to the IC chip set 10 and the transmission synthesizer 32 are unswitched. The other components operate in a manner similar to the radio communication apparatus described above with respect to FIG. 2.

The operation of the radio communication apparatus of FIG. 10 is described as follows. The level detector 64 detects the level of power amplified signals outputted from the power amplifier 62 and supplies the level to the APC circuit 65. The output of the level detector 64 is also supplied to the transmission detector 660 for determining whether the level exceeds a predetermined threshold level. When the level is equal to or exceeds the predetermined threshold level, the transmission detector 660 supplies a logical high level signal to the controller 310. In the controller 310, a transmission error determining means 310a operates in the same manner as the transmission error determining means 31a of FIG. 2.

When the transmission error determining means 310a determines that a logical high level signal is output from the transmission detector 66 during unassigned time slots, a transmission control means 310b supplies logical low level control signals so as to open switch 51 so as to disable the power amplifier 62 and/or ceases to supply clock signals to the IC chip set 10 so as to disable the IC chip set 10, thereby terminating transmission.

While embodiments of the present invention have been illustrated and described with respect to FIG. 2 and FIG. 10, the present invention is not so limited. When a radio communication apparatus includes a transmission circuit formed from devices which require clock signals to operate, the operation of the transmission circuit can be controlled by clock signals supplied to the devices of the transmission circuit. Furthermore, if the transmission circuit includes circuit blocks that operate independently, the operation of the transmission circuit can be controlled by disconnecting the power supply potentials supplied to the various circuit blocks of the transmission circuit.

In addition, the transmission detector 66 may comprise an analog-to-digital converter which outputs to the controller 31 digital data signals showing the level of the power amplified signals. In this case, the transmission error determining means 31a may compare the level shown in the digital data signals with the threshold level. When the level of the digital data signals is greater than the threshold level, the transmission control means 31b may prevent transmitting operations by providing logical low level control signals to the switches 51, 52, 53, and 63.

Further, signals to be prevented from being transmitted according to the present invention may not be limited to the speech signals supplied from the microphone, but may include signals such as data signals transmitted in a data communication system and speech synthesized signals supplied from a speech synthesis apparatus.

Still further, although the present invention as described applies to a radio communication apparatus of a cellular radio telephone system, the present invention may be applied to any other kind of radio communication apparatus which transmits signals in a TDMA transmission method, including but not limited to a digital, dual mode or multiple mode radio telephone, a U.S. digital cellular radio telephone, a Japanese digital cellular radio telephone, a digital satellite radio telephone, an automobile telephone, a portable telephone, a cordless telephone, and a satellite communication apparatus.

Other variations, such as arrangement of and placement of circuit components, frame constitutions of TDMA signals, the way of recognizing transmission errors, the way of controlling transmission prevention, and algorithm of the controlling, may be made within the scope of the present invention.

What is claimed is:

1. A radio communication apparatus for use in a time division multiple access system wherein signals are transmitted between the apparatus and a base station over a radio link during a time slot assigned to the apparatus, the apparatus comprising:

transmitting means for transmitting signals to said base station over said radio link;

error determining means for determining independent of signals received from said base station whether said transmitting means transmits signals during a time other than the assigned time slot; and transmission prevention means for preventing signals from being transmitted by said transmitting means in response to said error determining means determining that said transmitting means transmits signals during the time other than the assigned time slot.

2. The apparatus of claim 1, wherein said transmitting means comprises amplifying means for amplifying signals to be transmitted to said base station over said radio link.

3. The apparatus of claim 1, wherein said error determining means comprises detecting means for detecting operation of said transmitting means and for providing a detection signal representative of the detected operation.

4. The apparatus of claim 3, wherein said detecting means includes means for detecting a level of the signals to be transmitted by said transmitting means, the detection signal representing the level of the signals to be transmitted, and wherein it is determined that said transmitting means is transmitting when the detection signal exceeds a predetermined level.

5. The apparatus of claim 4, wherein the predetermined level is lower than a lowest transmission level allowed in said system.

6. The apparatus of claim 1, wherein said error determining means determines whether said transmitting means transmits signals during a time period within unassigned time slots.

7. The apparatus of claim 6, wherein said time period is less than or equal to a duration of one time slot.

8. The apparatus of claim 1, wherein said error determining means determines whether said transmitting means transmits signals during a plurality of time periods within unassigned time slots.

9. The apparatus of claim 1, wherein said error determining means determines whether said transmitting means transmits signals continuously during unassigned time slots.

10. The apparatus of claim 1, wherein said error determining means terminates operation in response to determining that said transmitting means transmits signals during the time other than the assigned time slot.

11. The apparatus of claim 1, wherein said error determining means continues operation in response to determining that said transmitting means transmits signals during the time other than the assigned time slot.

12. The apparatus of claim 1, wherein said transmitting means comprises amplifying means for amplifying signals to be transmitted to said base station over said radio link; said apparatus further comprises power supply means for supplying power to said amplifying means; and wherein said transmission prevention means includes means for disconnecting said power supply means from said amplifying means.

13. The apparatus of claim 1, further comprising frequency supply means for supplying predetermined frequency signals to be mixed with signals to be transmitted to said base station over said radio link and power supply means for supplying power to said frequency supplying means; and wherein said transmission prevention means includes means for disconnecting said power supply means from said frequency supplying means.

14. The apparatus of claim 1, further comprising signal processing means for processing signals to be transmitted to said base station over said radio link and power supply means for supplying power to said signal processing means; and wherein said transmission prevention means includes means for disconnecting said power supply means from said signal processing means.

15. The apparatus of claim 14 wherein said signal processing means comprises a device requiring clock signals for operation; means for applying clock signals to said device; and wherein said transmission prevention means includes means for terminating application of said clock signals to said device responsive to said error determining means.

16. The apparatus of claim 1, further comprising an antenna and inputting means for inputting information for transmission; and wherein said transmission prevention means includes means for disconnecting a path between said inputting means and said antenna responsive to said error determining means.

17. The apparatus of claim 1, further comprising informing means for informing a user of a transmission error in response to said error determining means determining that said transmitting means transmits signals during the time other than the assigned time slot.

18. The apparatus of claim 1, further comprising signal processing means, including a device requiring clock signals for operation, for processing signals to be transmitted to said base station over said radio link, and means for applying clock signals to said device; wherein said transmission prevention means includes means for terminating application of said clock signals to said device responsive to said error determining means.

19. A radio communication apparatus for use in a time division multiple access system wherein signals are transmitted between the apparatus and a base station over a radio link during a time slot assigned to the apparatus, the apparatus comprising:

transmitting means for transmitting signals to said base station over said radio link;

detecting means for detecting transmission by said transmitting means;

identifying means for identifying occurrence of the assigned time slot; and control means, responsive to said detecting means and said identifying means, for determining independent of signals received from said base station whether said transmitting means transmits signals during a time other than the assigned time slot, and for preventing signals from being transmitted by said transmitting means upon determining that said transmitting means transmits signals during the time other than the assigned time slot.

20. A radio communication apparatus for use in a time division multiple access system wherein signals are transmitted between the apparatus and a base station over a radio link during a time slot assigned to the apparatus, the apparatus comprising:

transmitting means for transmitting signals to said base station over said radio link;

power supply means for supplying a power supply potential to components of said transmitting means; and control means for identifying occurrence of the assigned time slot, for determining whether said transmitting means transmits signals during a time other than the assigned time slot, and for disconnecting said power supply means from said transmitting means upon determining that said transmitting means transmits signals during the time other than the assigned time slot.

21. In a radio communication apparatus for use in a time division multiple access system wherein signals are transmitted between the apparatus and a base station over a radio link during a time slot assigned to the apparatus, a method of operation comprising the steps of:

transmitting signals to said base station over said radio link;

determining independent of signals received from said base station whether said signals are transmitted during a time other than the assigned time slot; and preventing said signals from being transmitted upon determining that said signals are transmitted during the time other than the assigned time slot.

22. The method of claim 21, wherein the step of determining is performed during a time period within unassigned time slots.

23. The method of claim 22 wherein said time period is less than or equal to a duration of one time slot.

24. The method of claim 21 wherein the step of determining is performed during a plurality of time periods within unassigned time slots.

25. The method of claim 21 wherein the step of determining is performed continuously during unassigned time slots.

* * * * *